United States Patent
Yang et al.

(10) Patent No.: US 9,646,413 B2
(45) Date of Patent: May 9, 2017

(54) SYSTEM AND METHOD FOR REMOTE SHADOW RENDERING IN A 3D VIRTUAL ENVIRONMENT

(71) Applicants: Lei Yang, Cupertino, CA (US); Liu Ren, Cupertino, CA (US)

(72) Inventors: Lei Yang, Cupertino, CA (US); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/836,349

(22) Filed: Aug. 26, 2015

(65) Prior Publication Data

US 2016/0063757 A1 Mar. 3, 2016

Related U.S. Application Data

(60) Provisional application No. 62/042,274, filed on Aug. 27, 2014.

(51) Int. Cl.
*G06T 15/60* (2006.01)
(52) U.S. Cl.
CPC .................... *G06T 15/60* (2013.01)
(58) Field of Classification Search
None
See application file for complete search history.

(56) References Cited

U.S. PATENT DOCUMENTS

| | | | |
|---|---|---|---|
| 6,664,962 B1 | 12/2003 | Komsthoeft et al. | |
| 6,930,685 B1 | 8/2005 | Sakagawa et al. | |
| 7,023,438 B2 | 4/2006 | Lokovic et al. | |
| 7,119,806 B1 | 10/2006 | Donovan et al. | |
| 7,233,332 B2 | 6/2007 | Lokovic et al. | |
| 7,508,390 B1 | 3/2009 | Demers | |
| 7,538,766 B2 | 5/2009 | Zhou et al. | |
| 8,379,021 B1 | 2/2013 | Miller et al. | |
| 8,436,855 B1 | 5/2013 | Morgan et al. | |
| 8,643,678 B1 | 2/2014 | Jacobs et al. | |
| 2012/0133790 A1 | 5/2012 | Sams | |
| 2012/0197600 A1 | 8/2012 | Bai et al. | |

(Continued)

OTHER PUBLICATIONS

"Shadow Mapping." Wikipedia. N.p., Jun. 28, 2014. Web. <https://en.wikipedia.org/w/index.php?title=Shadow_mapping&oldid=614768900>.*

(Continued)

*Primary Examiner* — Vu Nguyen
(74) *Attorney, Agent, or Firm* — Maginot Moore & Beck LLP

(57) ABSTRACT

A method for rendering shadows in a 3D virtual environment includes generating a depth rasterization map corresponding to a plurality of objects in a three-dimensional virtual environment and a shadow interval map with reference to the depth map and a predetermined path of a light source in the environment that casts light onto at least one object in the plurality of objects that generates a shadow in the three-dimensional virtual environment with a server computing device. The method includes transmitting the shadow interval map from the server to a client and generating, with a processor in the client, a graphical depiction of the virtual environment including at least one shadow generated with reference to the shadow interval map, the at least one shadow corresponding to the light source and the plurality of objects in the virtual environment.

3 Claims, 4 Drawing Sheets

(56) References Cited

U.S. PATENT DOCUMENTS

| | | |
|---|---|---|
| 2013/0265310 A1 | 10/2013 | Hirtzlin et al. |
| 2013/0268583 A1 | 10/2013 | Sheppard et al. |
| 2014/0267271 A1 | 9/2014 | Billeter et al. |
| 2014/0375634 A1* | 12/2014 | Hillesland ............... G06T 15/20 345/420 |

OTHER PUBLICATIONS

"Chapter 13. Generating Soft Shadows Using Occlusion Interval Maps." N.p., Apr. 27, 2014. Web. <https://web.archive.org/web/20140427030645/http://http.developer.nvidia.com/GPUGems/gpugems_ch13.html>.*

International Search Report and Written Opinion corresponding to PCT Application No. PCT/US2015/047085, mailed Dec. 7, 2015 (10 pages).

Crassin, Cyril et al., "Cloudlight: A System for Amortizing Indirect Lighting in Real-Time Rending".Technical report, NVIDIA Corporation. Jul. 2013.

Lawton, George, "Cloud Streaming Brings Video to Mobile Devices". IEEE Computer. 2012. vol. 45. pp. 14-16.

Sharp, Ron, "Latency in Cloud-Based Interactive Streaming Content". Bell Labs Technical Journal. Sep. 2012. vol. 17. Issue 2. pp. 67-80.

Williams, Lance, "Casting Curved Shadows on Curved Surfaces". Computer Graphics. SIGGRAPH 1978. vol. 12. Issue 3. pp. 270-274.

* cited by examiner

SYSTEM AND METHOD FOR REMOTE SHADOW RENDERING IN A 3D VIRTUAL ENVIRONMENT

CLAIM OF PRIORITY

This application claims priority to U.S. Provisional Application No. 62/042,274, which is entitled "System And Method For Remote Shadow Rendering In a 3D Virtual Environment," and was filed on Aug. 27, 2014, the entire contents of which are hereby incorporated by reference herein.

FIELD disclosure relates generally to the field of computer graphics and, more specifically, to systems and methods that render shadows graphics that depict three-dimensional virtual environments.

BACKGROUND

Rendering shadow in 3D scene has been a difficult problem and a continuing topic of interest in 3D computer graphics and real-time rendering. The most commonly used traditional method for generating real-time shadow is shadow mapping, which involves generating a depth map from the light perspective and performing a depth comparison in the main rendering pass. Shadow mapping is relatively fast to perform, and is applicable to generate dynamic shadows. However, many mobile graphical processing units (GPUs) do not implement traditional shadow mapping because of hardware and power limitations. For example, many GPUs that support the OpenGL ES 2.0 standard do not implement traditional shadow mapping. Traditional shadow mapping techniques also experience problems that are difficult to mitigate, such as shadow acne and perspective aliasing. When deploying the shadow mapping process to a rendering pipeline, the developer has to carefully tune many parameters such as the perspective transformation parameters, shadow map resolution, polygon offset, etc., making it a very difficult and time consuming task. These issues preclude the generation of a single set of parameters and for the depiction of shadows for all models and scenes, leading to a less scalable solution.

In recent years, numerous methods have been proposed to improve shadow mapping quality. While newer shadow mapping techniques can improve the quality of rendered shadows, these techniques also add complexity to the basic shadow mapping process, which makes rendering the shadows more difficult to perform with mobile and embedded platforms that often have lower processing capabilities and often rely on batteries that are depleted more quickly during intense processing. Consequently, improvements to 3D visualization techniques for rendering shadows in the graphical displays produced by mobile and embedded devices would be beneficial.

SUMMARY

This document describes a method that allows a client computer (i.e. PC, mobile, or embedded) to render real-time shadow effects with additional data provided by the cloud (i.e. servers). By leveraging the power of cloud computing, we are able to render fine shadow effects with minimized client computation cost. This enables the use of current generation mobile hardware, which is usually not powerful enough to run existing shadow rendering methods.

One method targets 2.5D city scenes and light sources that moves along fixed paths, such as the sun. The server computes a view-independent shadow interval map of the scene, and streams the map to all clients. The client uses this map to determine whether each visible point in the scene is in shadow. Unlike existing shadow map approaches, which requires instant update whenever the light moves, this shadow interval map is valid for a period of time, and can be updated locally and progressively. Therefore, the systems and methods described herein tolerate low bandwidth and temporary network outage. Furthermore, the systems and methods described below render the shadow graphics without common graphical artifacts that are associated with shadow maps, such as shadow acne.

The systems and methods described herein include a server-based method for rendering direct shadow effects on a variety of client devices (PC, mobile, embedded) with a small computation cost. A shadow generation algorithm targets 2.5D scenes, which include a fixed light path for a light source and slow light motion. The shadow generation process includes highly efficient shadow evaluation on low-powered clients compared with shadow mapping, reduces or eliminates common shadow mapping artifacts, requires a low data transmission rate for streaming shadow data between the client and the server compared to streaming full video of the 3D graphics, enables a mobile or embedded device to perform a local and progressive update of shadow data unlike streaming of full light maps, and enables uninterrupted rendering with temporary network outage or excessive latency.

In one embodiment, a method of rendering shadows in a graphical display of a three-dimensional virtual environment has been developed. The method includes generating with a first processor in a server computing device a depth rasterization map corresponding to a plurality of objects in a three-dimensional virtual environment, generating with the first processor in the server computing device a shadow interval map with reference to the depth map and a predetermined path of a light source in the three-dimensional virtual environment that casts light onto at least one object in the plurality of objects that generates a shadow in the three-dimensional virtual environment, transmitting from the server the shadow interval map to a client computing device, and generating with a second processor in the client computing device a graphical depiction of the three-dimensional virtual environment including at least one shadow generated with reference to the shadow interval map from the server computing device, the at least one shadow corresponding to the light source and the plurality of objects in the three-dimensional virtual environment.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "mobile device", refers to any electronic computing device that is carried by a person or embedded in a vehicle or other moving object and that displays graphics to a user. Examples of mobile electronic devices include, but are not limited to, smartphones, tablets, notebook computers, handheld GPS navigation devices, wearable computing device, in-vehicle information systems that are embedded in many vehicles, and any portable electronic computing device that is configured to generate graphics corresponding to a three-dimensional (3D) virtual environment. Mobile devices incorporate a processor that typically includes at least one central processing unit (CPU) core along with a graphics processing unit (GPU), which are implemented as separate components or integrated into a System on a Chip (SoC) in different embodiments. The processor executes program instructions stored in a memory to render a 3D virtual environment using geometry, lighting, texture, and other graphics data that are stored in the memory. Mobile devices typically include one or more wireless network devices including, but not limited to, wireless wide area network (WWAN) and wireless local area network (WLAN) devices. In some embodiments, at least some of the graphics data are retrieved from server through a data network so the memory in the mobile device is only required to store a limited set of graphics data that are replaced with different sets of graphics data during operation of the mobile device. One example of a type of application that uses the processor to generate graphics corresponding to a 3D virtual environment with shadows is a mapping and navigation application, although the systems and methods described below can be used with a wide range of 3D graphics applications.

Figure 1:
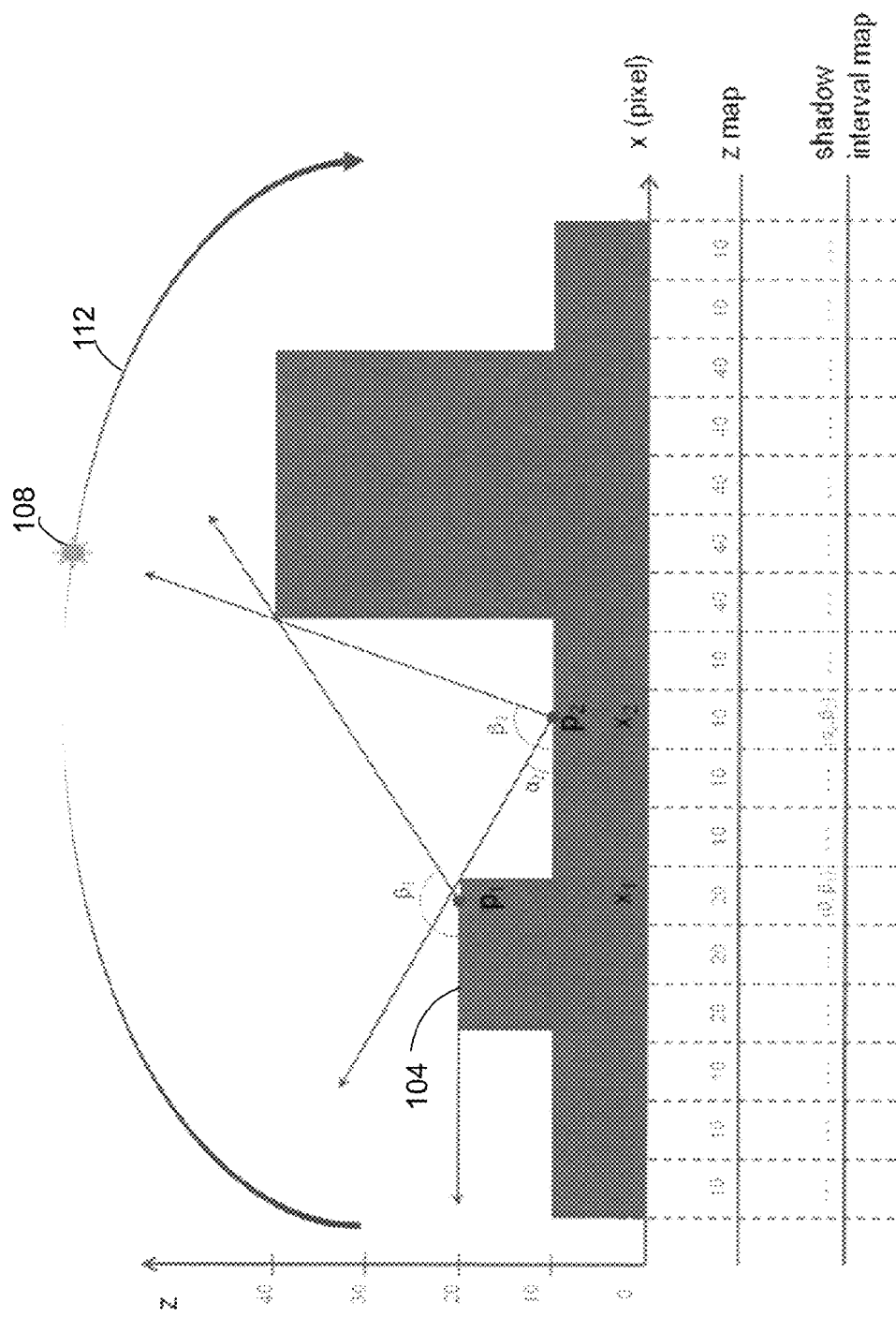
FIG. 1 is a cross-sectional view of a shadow interval map that is formed on a depth-map of one or more objects in a three-dimensional virtual environment.

FIG. 1 depicts a shadow interval map. The shadow interval map is generated on a server computing device, which typically includes more powerful hardware than client mobile devices and is typically connected to an electric grid instead of relying on a battery for electrical power. The term "shadow interval map" (SIM) refers to a map of data that stores the light visibility information of each surface point visible from the top of the scene, such as in an overhead plan view of the scene in the 3D virtual environment. The SIM is also referred to as a 2.5 dimensional (2.5D) map since the SIM is a pixilated map corresponding to the depth map (0.5D), which is generated for objects and other features on the X-Y plane in the 3D virtual environment.

FIG. 1 depicts a situation where a light source, such as a representation of the sun in a 3D virtual environment corresponding to a city or other outdoor environment, moves in a path that is perpendicular to the X-Y plane. The X-Y plane in FIG. 1 represents a flat surface of the ground. Terrain features and other objects in the 3D virtual environment extend from the X-Y plane along the Z axis in the 3D virtual environment. FIG. 1 depicts a cross-sectional (X-Z) illustration of a shadow interval map in a 2.5D scene with the sun path perpendicular to the X-Y plane. The regions 104 represent solid objects in the scene and the light source 108 moves along a predetermined path 112 that is perpendicular to the X-Y plane. The angles represent opening and closing angle of the light-visibility function (interval) at each surface point. These angles are stored in the shadow interval map for every visible surface point from the Z direction.

FIG. 1 shows a cross-sectional (X-Z) illustration of a SIM in a 2.5D scene with light path fixed on the X-Z plane. In FIG. 1, the light from the light source 108 is directional, which is to say that the light behaves in the same manner as sun light, or any point light that is far enough from the scene. Therefore at each particular time the sun direction will be the same to every location in the whole scene in the 3D virtual environment. Since the light direction sweeps across a 180° arc, for each surface point in the scene, the visibility of the light source 108 is an angular interval $[\alpha, \beta]$. For example, for pixel $x_1$, the surface point $p_1$ has a light visibility interval of $[0, \beta_1]$, which means that the light is visible to $p_1$ when the light source 108 is within the angular visibility interval.

The server system stores such an angular interval for each point (pixel) on the X-Y map of the scene, which corresponds to each z-map sample point of the 2.5D model to generate the SIM. The server transmits the SIM to the client mobile devices that use the SIM to generate shadows without requiring the client mobile devices to perform more complex shadow generation techniques. The SIM acts as a lookup table (LUT) that the clients use during rendering. The clients perform the in-shadow test for each surface sample point in the map in an efficient manner, through testing whether the incoming light angle is within the interval that is stored in the SIM.

Figure 2:
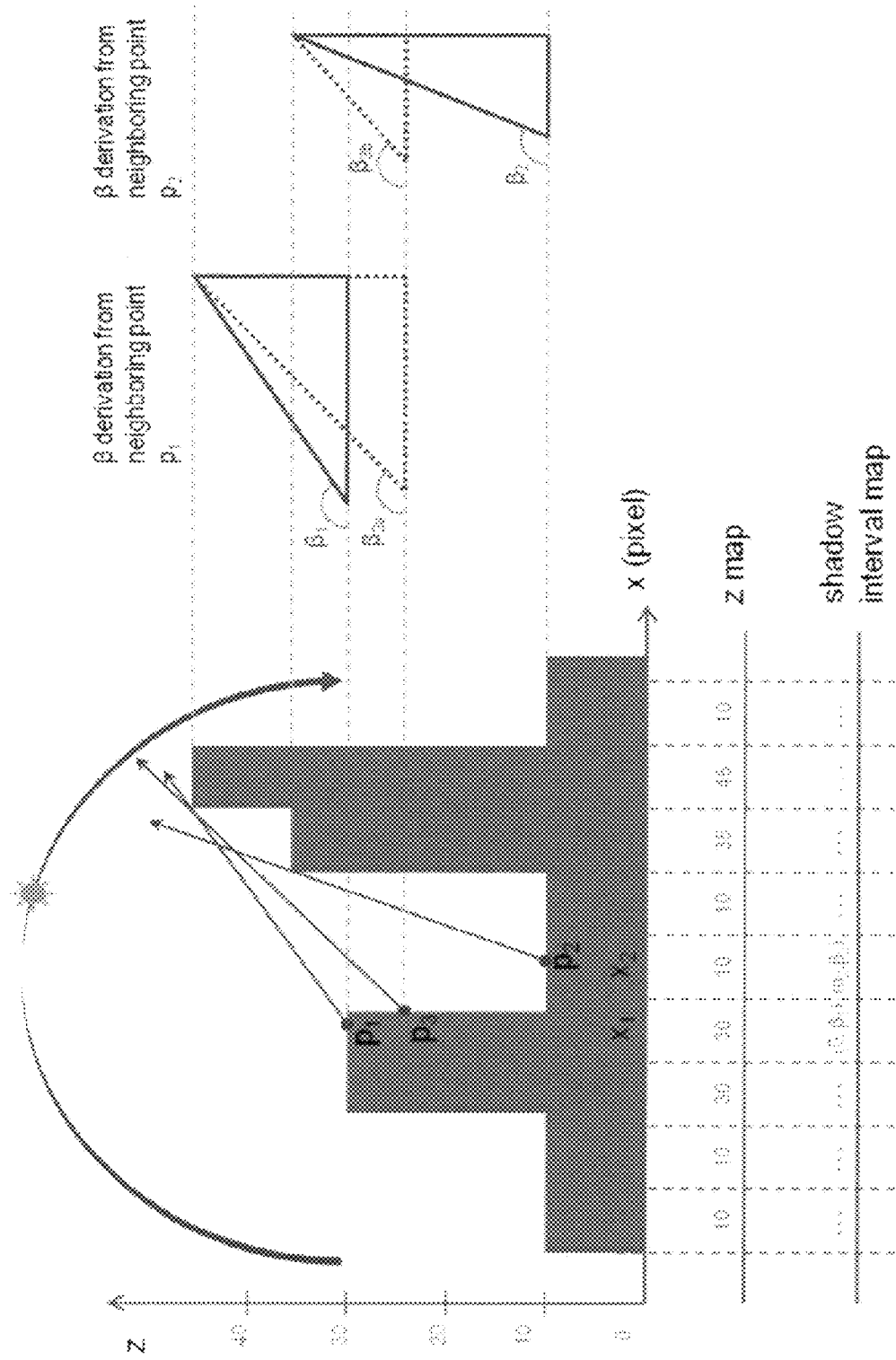
FIG. 2 depicts an example of visibility interval derivation in the shadow interval map of FIG. 1.

In the 3D virtual environment, some locations on objects are not directly mapped in the SIM. For example, the height of shadows that are projected on the vertical surfaces on objects 104 in FIG. 1 can change based on the position of the light source 108 even though a column of points on the vertical surface has a single location on the X-Y axis, where the SIM is represented. The client device derives the interval based on SIM information for neighboring pixels to identify locations in the shadow for vertical surfaces and other surfaces that are not directly mapped in the SIM. FIG. 2 depicts an example of deriving the light visibility interval of such a point, $p_3$, from neighboring sample points $p_1$ and $p_2$. The processor in the client computing device uses trigonometry and geometric relationships based on relative positions of $p_1$, $p_2$, and p3, to identify the closing (or opening) angle of the visibility interval. Note that the angle can be identified from each of the neighboring sample points. This indicates that more than one part in the scene can occlude the surface point in interest. In the example shown in FIG. 2, $p_1$ and $p_2$ are occluded by different corners of the solid extrusion on the right at interval closing angles. Therefore $p_3$, depending on the vertical position along the Z axis, may be occluded by either of the corners at the interval closing angle. The processor in the client computing device selects the smallest interval for the neighboring corners $p_1$ and $p_2$ to identify the interval for the pixel $p_3$.

As depicted in FIG. 2, the client computing device identifies a light visibility interval for arbitrary surface points. The interval closing angle $\beta_3$ of surface point $p_3$ is identified from neighboring sample point, $p_1$ or $p_2$. The identification is based on relative position of the points illustrated in FIG. 2. Note that the client processor identifies both $\beta_{3a}$, (based on $p_1$) and $\beta_{3a}$ (based on $p_2$), and the final result is selected to subtend the smallest visibility interval. In the example of FIG. 2, $\beta_3=\beta_{3a}$ if $\beta_{3a}<\beta_{3b}$, otherwise $\beta_3=\beta_{3b}$.

Figure 3:
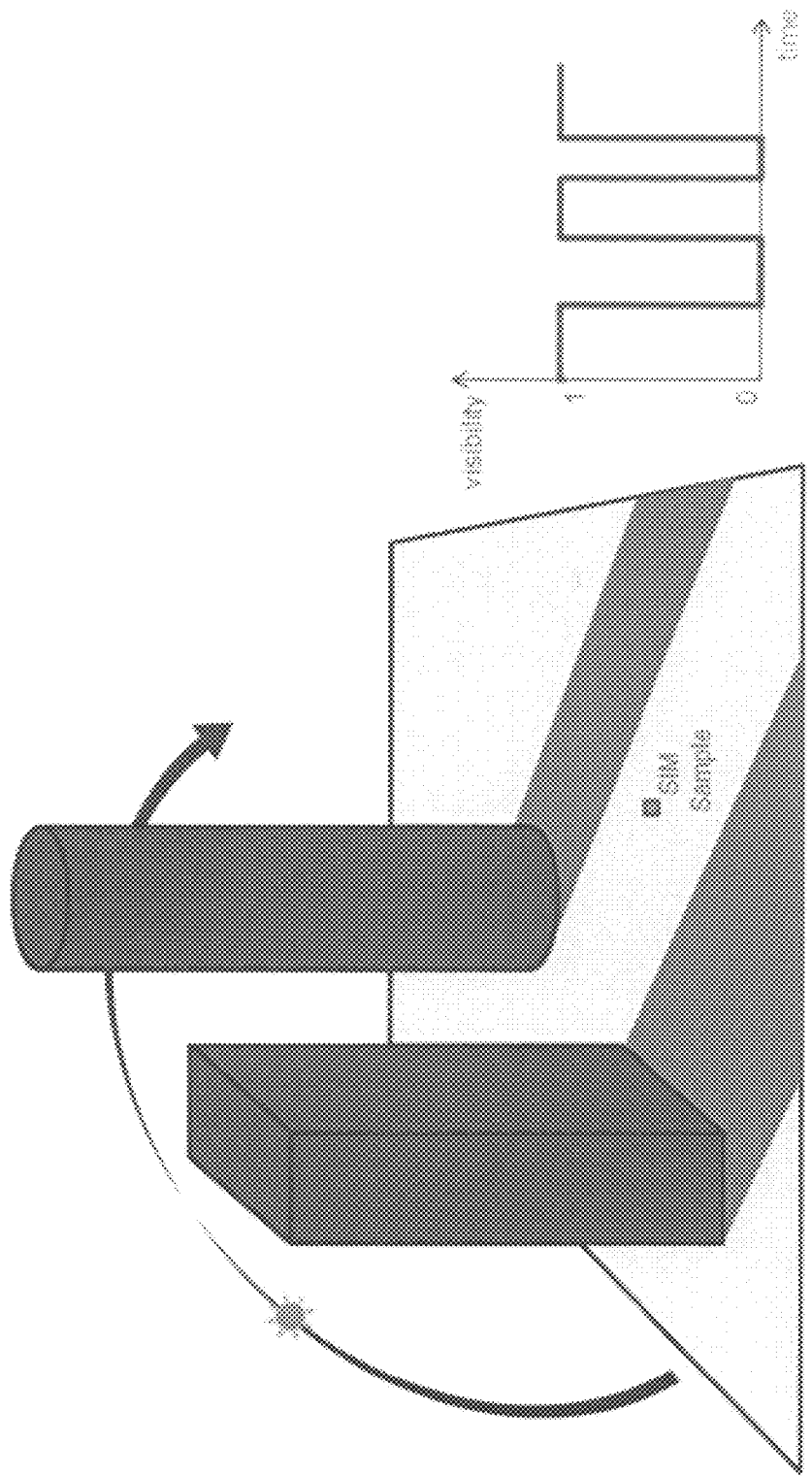
FIG. 3 is a depiction of multiple intervals for a shadow map in a three-dimensional virtual environment when a path of a light source is not perpendicular to an XY plane in the three-dimensional virtual environment.

FIG. 1 and FIG. 2 depict a situation where each pixel location on the surface of the 2.5D scene that forms the basis for the SIM includes a single interval for the shadows from a light source. FIG. 3 depicts another scenario in which the path of the light source is not perpendicular to the X-Y plane, which produces situations where multiple shadow intervals exist for at least some pixels based on the size, shape, and distribution of occluding objects in the 3D virtual environment. For example, a surface point in the scene may be occluded by different objects seeing from different light direction, leading to multiple intervals in the visibility function. FIG. 3 illustrates such an example. To enable use of the SIM in mobile devices that often have limited memory capacity, the server generates the SIM with only a single visibility interval per sample. To accommodate situations where multiple shadow intervals occur as the light source travels along a path, the server divide the light animation time into a set of ranges corresponding to the animation of the light source through the 3D virtual environment. The server divides the time ranges such that within each time range, the shadow intervals for each pixel in the 3D virtual environment can be stored in a single SIM (i.e. single visibility interval per sample). The division in time is always possible when the number of occluders in the scene is limited. For a typical city scene, the set of time ranges is always bounded in size. The server computing device updates the SIM as the light source travels along the path during different time intervals, and the server computing device transmits updated SIM data to the client computing devices as needed to enable the client computing devices to generate the shadows during different time intervals as the light source moves along the predetermined path.

Figure 4:
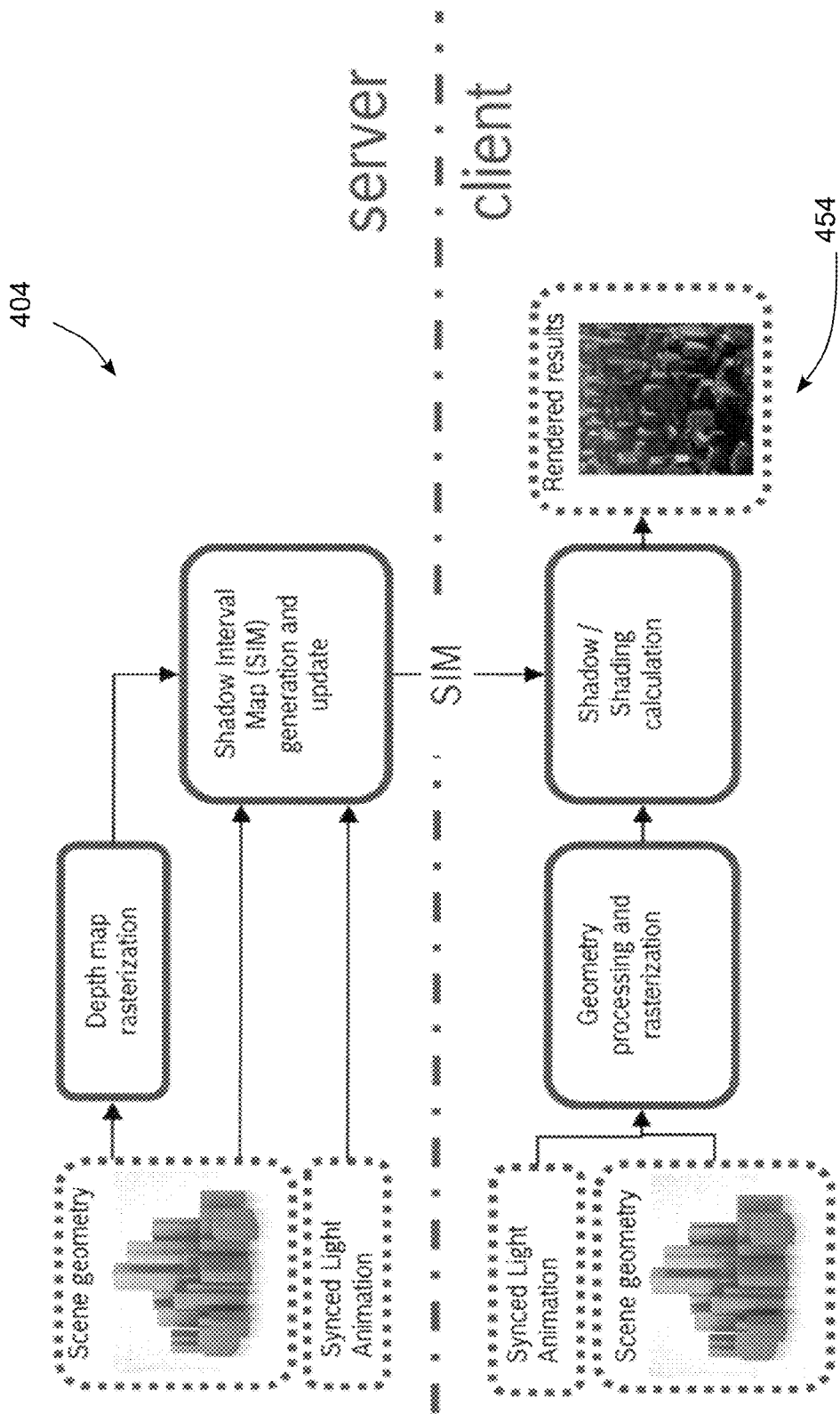
FIG. 4 is a depiction of system components and processing for generating shadow interval maps on a server computing device that are transmitted to one or more client computing devices to render shadows in a three-dimensional virtual environment.

FIG. 4 depicts a system diagram for a server computing device 404 that generates the SIMs for a 3D virtual environment and one or more client computing devices 454 that receive the SIMs through a data network and use the SIMs to generate shadows in graphical renderings of the 3D virtual environment.

The server 404 generates SIMs for each light-animation time range. The server transmits the SIM through a data network to one or more clients that depict the same 3D virtual environment with the same objects and light sources. The server 404 first generates a depth map of the visible surface of the scene, to establish the 2.5D representation of the geometry. The server 404 then generates the SIM based on light animation path, in the same space as the depth map. If multiple SIMs are needed, such as in situations where multiple intervals are identified for one or more pixels in the map intervals, the server 404 splits the animation time range such that within each time range the map only contain single intervals for all pixels. The server can either compute the whole set of SIMs at once and buffer the SIMs, assuming that the light animation path does not change, or gradually compute SIMs as time progresses through different time intervals.

One method for generating the SIM in the server is to use ray tracing. In a ray tracing embodiment, the server 404 traces rays from each pixel towards a light position to identify if the pixel is visible from the light at each position of the light source. For a specific animation time range, the server 404 evenly samples all possible light directions along the light path, and traces rays towards these samples to determine the approximate opening angle $\alpha$ and closing angle $\beta$ of the shadow interval at each pixel. The angles $\alpha$ and $\beta$ can be further refined by applying a binary search around the approximate angles. The server 404 repeats the ray tracing process for all pixels in a SIM.

In another embodiment, the server 404 generates the SIM through rasterization. From any specific light direction, the server 404 rasterizes the scene geometry to a second depth buffer, in a similar manner to generating traditional shadow maps. Then shadow mapping approach can be used to determine whether each pixel on the SIM is visible from a predetermined direction of the light source. The server 404 repeats the rasterization process for all sampled light directions as the light source moves along the predetermined path. The server 404 identifies the angles $\alpha$ and $\beta$ are determined by tracking the visibility changes at each pixel.

As described above, each SIM is valid for a specific animation time range. When animation progresses, the client receives an updated SIM to ensure correct shadow rendering. Before such a switch occurs, the server 404 generates the next SIM to be used, and transmits the updated SIM to the client. Since this update will possibly affect only a small region of the SIM, the server 404 optionally transmits an incremental update to the client to minimize the network traffic and latency. In the finest granularity, the server can perform per-sample (per-pixel) update of the SIM, so that each sample will update its interval once the previous interval time has passed. Choosing the finest update granularity enables an optimal tradeoff in update frequency and update packet size.

The client computing device 454 is a regular rasterization-based real-time renderer, such as a processor found in mobile electronic devices that implement the OpenGL ES 2.0 or other similar 3D graphics standards. The client computing device 454 receives the SIM data the server computing device 404 and stores the SIM in a memory, such as a texture memory. During the rendering of each frame, the client transforms the geometry with a vertex shader, and rasterizes the scene as part of the GPU rendering pipeline. In the fragment shader, each fragment, which corresponds to a surface point, transforms its position to the corresponding position in the space of the SIM. The shader then determines the visible interval using the interval angle data in the SIM as described above. The in-shadow test is performed by testing whether the current light direction falls in to the computed visible interval. Optionally, the shader can perform a filtering step when looking up the SIM, in order to generate soft shadow effects. The shadow result will be a [0, 1] value and will be combined into the shading results to be displayed.

For certain large 3D virtual environments, the client computing device 454 only displays a small portion of the 3D virtual environment in any given frame of rendered 3D data. In these embodiments, the server 404 optionally generates only part of the SIM that affect a particular view, and transmits the appropriate part to the corresponding client to reduce network bandwidth and client memory requirements.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

The invention claimed is:

1. A method of rendering shadows in a graphical display of a three-dimensional virtual environment comprising:

generating with a first processor in a server computing device a depth rasterization map corresponding to a plurality of objects in a three-dimensional virtual environment;

generating with the first processor in the server computing device a shadow interval map with reference to the depth rasterization map and a predetermined path of a light source in the three-dimensional virtual environment that casts light onto at least one object in the plurality of objects that generates a shadow in the three-dimensional virtual environment, the generating of the shadow interval map further comprising:

generating with the first processor in the server computing device a first shadow interval map corresponding to a first portion of the predetermined path of the light source during a first time interval in the three-dimensional virtual environment; and generating with the first processor in the server computing device a second shadow interval map corresponding to a second portion of the predetermined path of the light source during a second time interval in the three-dimensional virtual environment, the second time interval being different than the first time interval and the second shadow interval map including at least one object in the three dimensional virtual environment that generates a shadow during the second time interval that is not generated during the first time interval;

transmitting from the server the shadow interval map to a client computing device; and generating with a second processor in the client computing device a graphical depiction of the three-dimensional virtual environment including at least one shadow generated with reference to the shadow interval map from the server computing device, the at least one shadow corresponding to the light source and the plurality of objects in the three-dimensional virtual environment.

2. The method of claim 1 wherein the predetermined path of the light source further comprises a parametric curve path through the three-dimensional virtual environment.

3. The method of claim 1, the rendering shadows further comprising:

generating with the second processor in the in the client computing device the graphical depiction of the three-dimensional virtual environment including the at least one shadow with the light source being in a first location in the three-dimensional virtual environment; and generating with the second processor in the in the client computing device the graphical depiction of the three-dimensional virtual environment including at least one other shadow with the light source being in a second location along the predetermined path in the three-dimensional virtual environment with reference to the shadow interval map and without requiring additional data from the server computing device.

* * * * *